(12) United States Patent
Wang

(10) Patent No.: US 10,384,402 B2
(45) Date of Patent: Aug. 20, 2019

(54) METHODS AND APPARATUSES FOR ADDITIVE MANUFACTURING

(71) Applicant: EMPIRE TECHNOLOGY DEVELOPMENT LLC, Wilmington, DE (US)

(72) Inventor: James Y. Wang, Beijing (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 145 days.

(21) Appl. No.: 15/119,044

(22) PCT Filed: Feb. 13, 2014

(86) PCT No.: PCT/CN2014/072027
§ 371 (c)(1),
(2) Date: Aug. 15, 2016

(87) PCT Pub. No.: WO2015/120596
PCT Pub. Date: Aug. 20, 2015

(65) Prior Publication Data
US 2016/0361868 A1    Dec. 15, 2016

(51) Int. Cl.
*B29C 67/00* (2017.01)
*B29C 70/54* (2006.01)
(Continued)

(52) U.S. Cl.
CPC .......... *B29C 67/0055* (2013.01); *B29C 48/92* (2019.02); *B29C 64/106* (2017.08);
(Continued)

(58) Field of Classification Search
CPC ...... B29C 47/30; B29C 64/205; B29C 64/209
See application file for complete search history.

(56) References Cited

U.S. PATENT DOCUMENTS

| 2011/0079936 | A1 | 4/2011 | Oxman |
| 2011/0107962 | A1* | 5/2011 | Chen ................... F16K 31/005 118/308 |
| 2013/0241114 | A1 | 9/2013 | Ravich et al. |
| 2015/0183161 | A1* | 7/2015 | Molinari ............ B29C 67/0085 425/375 |

FOREIGN PATENT DOCUMENTS

| CN | 2353768 Y | 12/1999 |
| CN | 1586865 A | 3/2005 |

(Continued)

OTHER PUBLICATIONS

"Dielectric elastomers," accessed at https://web.archive.org/web/20130729095355/http://en.wikipedia.org/wiki/Dielectric_elastomers, last modified on Jul. 4, 2013, pp. 4.

(Continued)

*Primary Examiner* — James Sanders

(57) ABSTRACT

Extrusion heads, methods of forming an extrusion head, and methods of forming an object are disclosed herein. An extrusion head may include a plurality of nozzles. Each nozzle may include a first opening configured to receive a solid material therein, a second opening configured to eject a molten material therefrom, a bore extending through the nozzle and connecting the first opening and the second opening, and an actuator positioned adjacent to the first opening and/or the second opening. The solid material may be heated to form the molten material. The additive manufacturing apparatus may further include a control device configured to signal each actuator to adjust an amount of the solid material received in the first opening and an amount of the molten material ejected from the second opening.

20 Claims, 15 Drawing Sheets

(51) Int. Cl.
*B33Y 30/00* (2015.01)
*B33Y 10/00* (2015.01)
*B33Y 50/02* (2015.01)
*B29C 64/106* (2017.01)
*B29C 64/386* (2017.01)
*B29C 48/92* (2019.01)
*B29K 101/12* (2006.01)
*B29K 105/00* (2006.01)
*B29C 48/30* (2019.01)
*B29C 48/25* (2019.01)
*B29C 48/345* (2019.01)

(52) U.S. Cl.
CPC .......... *B29C 64/386* (2017.08); *B29C 70/545* (2013.01); *B33Y 10/00* (2014.12); *B33Y 30/00* (2014.12); *B33Y 50/02* (2014.12); *B29C 48/266* (2019.02); *B29C 48/30* (2019.02); *B29C 48/345* (2019.02); *B29C 2948/926* (2019.02); *B29C 2948/92828* (2019.02); *B29C 2948/92866* (2019.02); *B29K 2101/12* (2013.01); *B29K 2105/0067* (2013.01)

(56) References Cited

FOREIGN PATENT DOCUMENTS

| | | |
|---|---|---|
| CN | 102922745 A | 2/2013 |
| CN | 103240883 A | 8/2013 |
| CN | 103347682 A | 10/2013 |
| JP | 2001079919 A | 3/2001 |
| JP | 2005342998 A | 12/2005 |

OTHER PUBLICATIONS

"Fused deposition modeling," accessed at https://web.archive.org/web/20131224155123/http://en.wikipedia.org/wiki/Fused_deposition_modeling, last modified on Dec. 22, 2013, pp. 3.

"Piezoelectric motor," accessed at https://web.archive.org/web/20140109234351/http://en.wikipedia.org/wiki/Piezoelectric_motor, last modified on Nov. 9, 2013, pp. 4.

International Search Report and Written Opinion for International Application No. PCT/CN2014/072027 dated Nov. 26, 2014, pp. 11.

Shikida, M., "Basic 5 Micro-actuator—Electrostatic actuator—," accessed at http://gcoe.mech.nagoya-u.ac.jp/basic/pdf/basic-05.pdf, accessed on Jul. 12, 2016, pp. 32.

* cited by examiner

METHODS AND APPARATUSES FOR ADDITIVE MANUFACTURING

CROSS-REFERENCE TO RELATED APPLICATION

This application is a U.S. national stage filing under 35 U.S.C. § 371 of International Application No. PCT/CN2014/072027 filed on Feb. 13, 2014 entitled "METHODS AND APPARATUSES FOR ADDITIVE MANUFACTURING," which is incorporated herein by reference in its entirety.

BACKGROUND

Fused deposition modeling (FDM) is a type of additive manufacturing, such as three-dimensional (3D) printing. The use of FDM has increased over time for the creation of polymeric objects with a higher level of precision than standard manufacturing processes.

Conventional FDM apparatuses require a significant amount of time to form an object. One limitation in current FDM apparatus designs is the number of nozzles present in extrusion heads. As such, the extrusion head of an FDM apparatus has to be moved frequently so that its nozzle can deposit material in a desired area to create the polymeric objects. The movement of the extrusion head results in a significant time period in which no material is deposited.

In addition to the printing time required by conventional FDM apparatuses, the movement of the extrusion head requires numerous mechanical parts that are subject to failure. Such failures may result in further delays. Moreover, additional calculations are necessary to ensure the extrusion head travels to precise locations at suitable times, which requires additional processor cycles. Thus, the possibility of error due to incorrect calculations and incorrect extrusion head movement is high in conventional FDM apparatuses.

SUMMARY

In an embodiment, an extrusion head for an additive manufacturing apparatus may include a plurality of nozzles. Each nozzle may include a first opening configured to receive a solid material therein, a second opening configured to eject a molten material therefrom, a bore extending through the nozzle and connecting the first opening and the second opening, and an actuator positioned adjacent to the first opening and the second opening. The solid material may be heated to form the molten material. The additive manufacturing apparatus may further include a control device configured to signal each actuator to adjust an amount of the solid material received in the first opening and an amount of molten material ejected from the second opening.

In an embodiment, a method of forming an object may include providing an additive manufacturing apparatus having an extrusion head. The extrusion head may include a plurality of nozzles. Each nozzle may include a first opening configured to receive a solid material therein, a second opening configured to eject a molten material therefrom, a bore extending through the nozzle and connecting the first opening and the second opening, and an actuator positioned adjacent to the first opening and the second opening. The solid material may be heated to form the molten material. The manufacturing apparatus may further include a control device configured to signal each actuator to adjust an amount of the solid material received in the first opening and an amount of molten material ejected from the second opening. The method may further include providing the solid material to the plurality of nozzles of the extrusion head, adjusting the amount of the solid material received by the nozzle and the amount of molten material ejected by the nozzle via the actuator, and signaling each actuator such that at least one nozzle deposits the molten material on a surface.

In an embodiment, a method of directing an extrusion head having a plurality of nozzles to form an object may include receiving, by a processor, at least one request to create the object and signaling, by the processor, a plurality of actuators to adjust an amount of a molten material deposited by a nozzle associated with each actuator in accordance with the at least one request such that the deposited molten material forms the object on a surface.

In an embodiment, a system for directing an extrusion head to form an object may include a plurality of nozzles in the extrusion head, a processor, and a non-transitory, computer-readable storage medium in communication with the processor. Each nozzle may include an actuator. The non-transitory, computer-readable storage medium may include one or more programming instructions that, when executed, cause the processor to receive at least one request to create the object and signal each actuator to adjust an amount of a molten material deposited by each nozzle in accordance with the at least one request such that the deposited molten material forms the object on a surface.

In an embodiment, a method of forming an extrusion head for an additive manufacturing apparatus may include providing a plurality of nozzles. Each nozzle may include a first opening, a second opening, and a bore extending through the nozzle and connecting the first opening and the second opening. For each of the plurality of nozzles, the method may include connecting an actuator to a nozzle such that the actuator is positioned adjacent to the first opening and the second opening. The method may also include connecting a control device to the extrusion head such that the control device is in communication with each of the actuators and configuring the control device to signal each actuator to adjust an amount of a solid material received in the first opening of each corresponding nozzle and an amount of a molten material ejected from the second opening of the nozzle. The solid material may be heated to form the molten material.

In an embodiment, an additive manufacturing apparatus may include an extrusion head. The extrusion head may include a plurality of nozzles. Each nozzle may include a first opening configured to receive a solid material therein, a second opening configured to eject a molten material therefrom, a bore extending through the nozzle and connecting the first opening and the second opening, and an actuator positioned adjacent to the first opening and the second opening. The solid material may be heated to form the molten material. The additive manufacturing apparatus may further include a control device configured to signal each actuator to adjust an amount of the solid material received in the first opening and an amount of molten material ejected from the second opening.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, an "additive manufacturing apparatus" is a device configured to create objects from polymeric materials via additive manufacturing. The additive manufacturing apparatus generally contains at least one extrusion head. In some embodiments, the additive manufacturing apparatus may be an extrusion-based layered deposition apparatus, such as a fused deposition modeling system. Such a system functions on an additive principle by placing material in layers to form an object.

As used herein, an "extrusion head" is an apparatus that is configured to convert a solid malleable mass of polymeric material under pressure into a continuous shape without pressure by passage of the polymeric material through at least one die, such as a nozzle, as described in greater detail herein. The extrusion head is also configured to heat the polymeric material and then rapidly cool the melted extrudate to keep its shape and dimensions. The extrusion head may be movable with respect to a surface upon which the polymeric extrudate is deposited. Accordingly, the extrusion head may cause at least one of its component nozzles to eject extrudate in various shapes, sizes, and/or patterns while the extrusion head is moving, thereby forming an object.

The present disclosure relates generally to an additive manufacturing apparatus and/or components thereof, particularly an extrusion head portion of the apparatus. The extrusion head may include a plurality of nozzles for depositing molten material at a more accurate and higher rate than conventional extrusion heads that only use a single nozzle. Since the extrusion head includes a plurality of nozzles, less movement of the extrusion head is required during an additive manufacturing process, which reduces or eliminates issues related to mechanical failure, inaccurate deposition, and/or the like.

Figure 1:
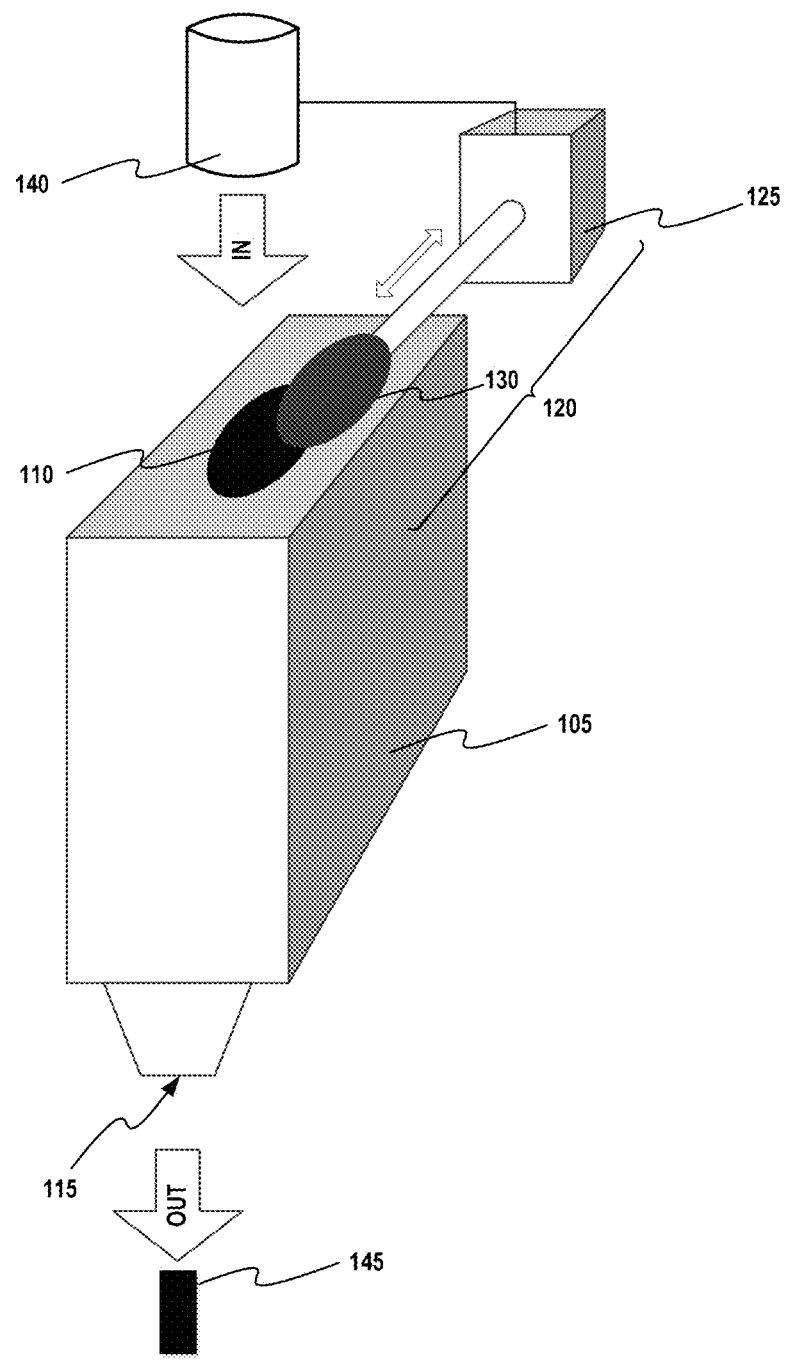
FIG. 1 depicts an illustrative nozzle portion of an extrusion head according to an embodiment.
Figure 2A:
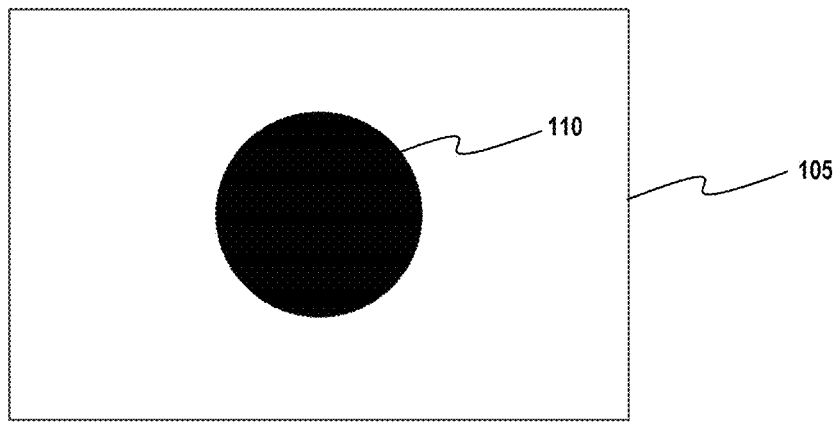
FIG. 2A depicts a top view of an illustrative nozzle according to an embodiment.
Figure 2B:
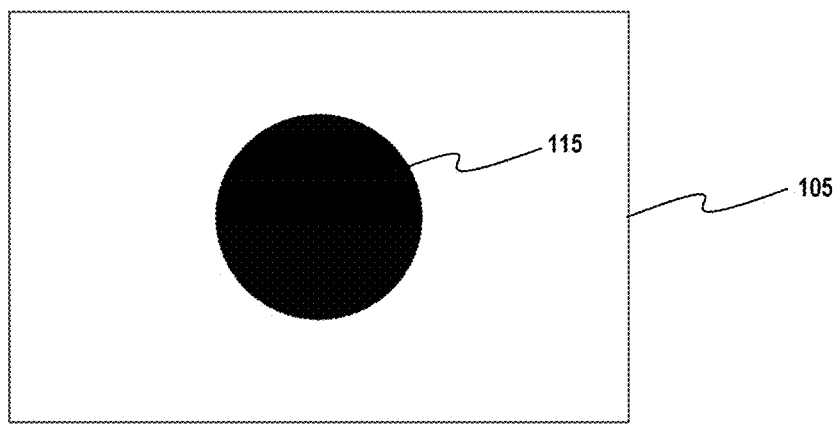
FIG. 2B depicts a bottom view of an illustrative nozzle according to an embodiment.
Figure 2C:
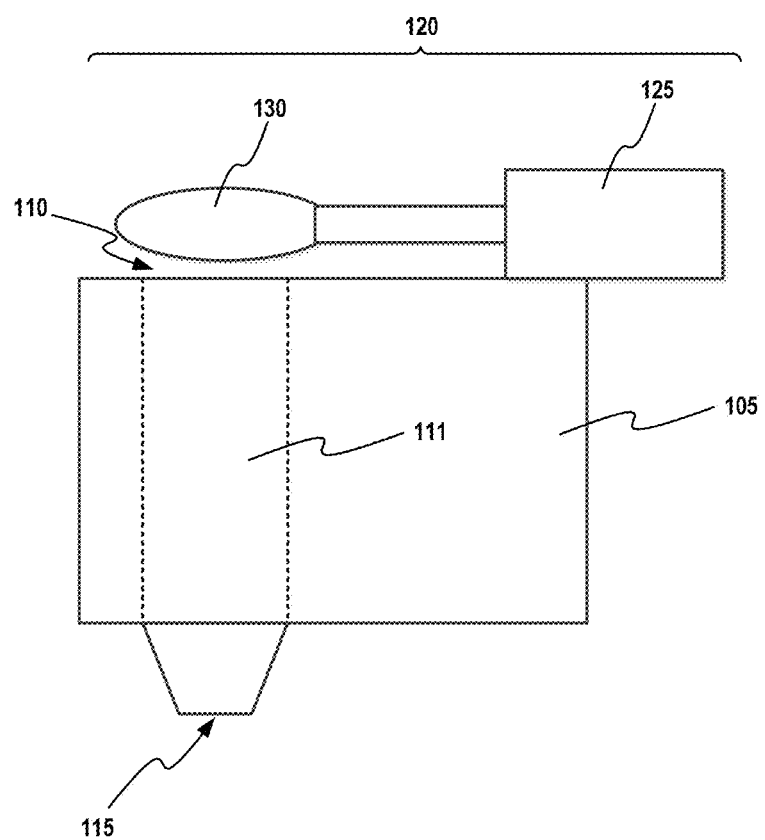
FIG. 2C depicts a cutaway side view of an illustrative nozzle according to a first embodiment.

FIG. 1 depicts an illustrative nozzle 105 portion of a extrusion head according to an embodiment. The nozzle 105 is not limited by this disclosure, and may generally be any nozzle suitable for receiving a solid material 140 and ejecting a molten material 145, as described in greater detail herein. As also depicted in FIGS. 2A and 2B, the nozzle 105 may generally include a first opening 110 and a second opening 115. The first opening 110 may be configured to receive a solid material 140, as described in greater detail herein. Similarly, the second opening 115 may be configured to eject a molten material 145 therefrom, as will be described in greater detail herein. As shown in FIG. 2C, the first opening 110 may be connected to the second opening 115 via a bore 111 extending through the nozzle 105.

Referring back to FIG. an actuator 120 may be configured to control an amount of solid material 140 that is provided to the first opening 110 of the nozzle 105. In some embodiments, the actuator 120 may further be configured to control an amount of molten material 145 that is ejected from the second opening 115. The actuator 120 may also be configured to control a flow rate and/or a pressure of the molten material 145 ejected from the second opening 115. To effect control of the amount of solid material 140 and/or molten material 145, the actuator 120 may include any number of constituent parts, such as, for example, a base portion 125 and a piezo portion 130. In some embodiments, the actuator 120 may be a component of the nozzle 105. In other embodiments, the actuator 120 may be a separate component in communication with the nozzle 105. While FIG. 1 depicts the actuator 120 as being located above the first opening 110, those with ordinary skill in the art will recognize that the actuator may be positioned at any location with respect to the nozzle 105. For example, in some embodiments, the actuator 120 may be positioned adjacent to the first opening 110 and/or adjacent to the second opening 115.

The actuator 120 is not limited by this disclosure, and may generally be any actuator. In some embodiments, the actuator 120 may be a microactuator. Illustrative microactuators may include, but are not limited to, a piezoelectric microactuator, a comb-drive microactuator, an S-shaped film microactuator, a tulip-shaped microactuator, an electroactive polymer microactuator, and the like.

Figure 4A:
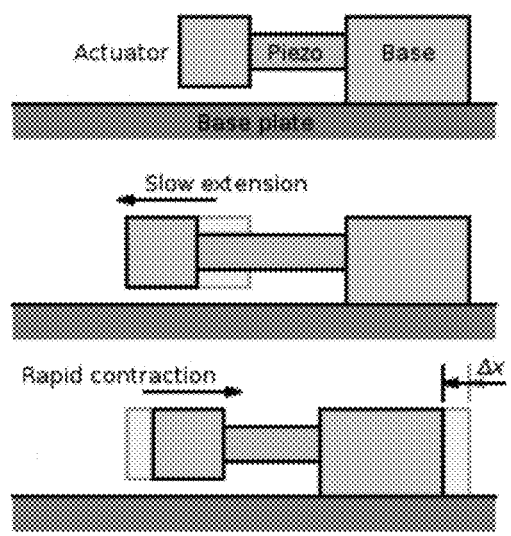
FIG. 4A depicts a block diagram of an illustrative piezoelectric actuator according to an embodiment.

As also shown in FIG. 4A, an illustrative piezoelectric microactuator may include the base portion 125 and the piezo portion 130. The piezoelectric microactuator may generally be any piezoelectric device or element, or any electronic device that operates in a similar fashion to a piezoelectric element, such as an electromagnet or a magnetostatic device. Those with ordinary skill in the art will be familiar with the typical function of a piezoelectric microactuator, which makes use of a converse piezoelectric effect whereby the actuator 120 produces acoustic or ultrasonic vibrations in order to produce a linear or rotary motion. For example, an elongation in a single plane may be used to make a series of stretches and position holds that are similar to a caterpillar movement.

Figure 4B:
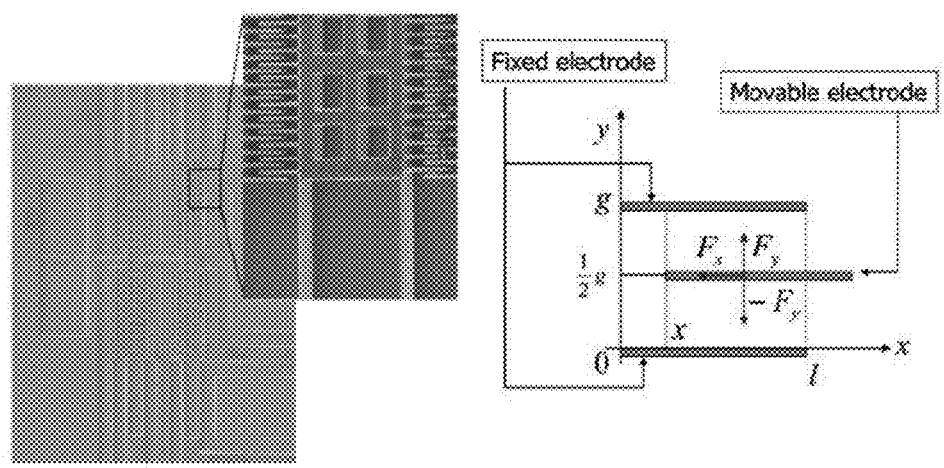
FIG. 4B depicts an illustrative comb-drive actuator according to an embodiment.

FIG. 4B depicts a comb drive microactuator. A comb drive microactuator may generally include a capacitor having two capacitor plates, where each capacitor plate has teeth capable of interdigitating with teeth of the other capacitor plate. At least one capacitor plate may move relative to the other capacitor plate. The teeth of each capacitor plate may increase a surface area of the capacitor, thereby increasing the associated capacitance. Due to the increased surface area, a comb drive microactuator may produce a lamer electrostatic force between its two capacitor plates relative to a planar capacitor having comparable overall dimensions but lacking capacitor plates with teeth. In a comb drive microactuator, the mobile capacitor plates may be physically fixed to a structure, such as, for example, the base portion 125 so that the movement of the mobile capacitor plates displaces and/or reorients the structure. Accordingly, the control voltages applied to the comb drive microactuator may be used to displace the mobile capacitor plates and displace and/or reorient the structure physically fixed to those mobile capacitor plates.

Figure 4C:
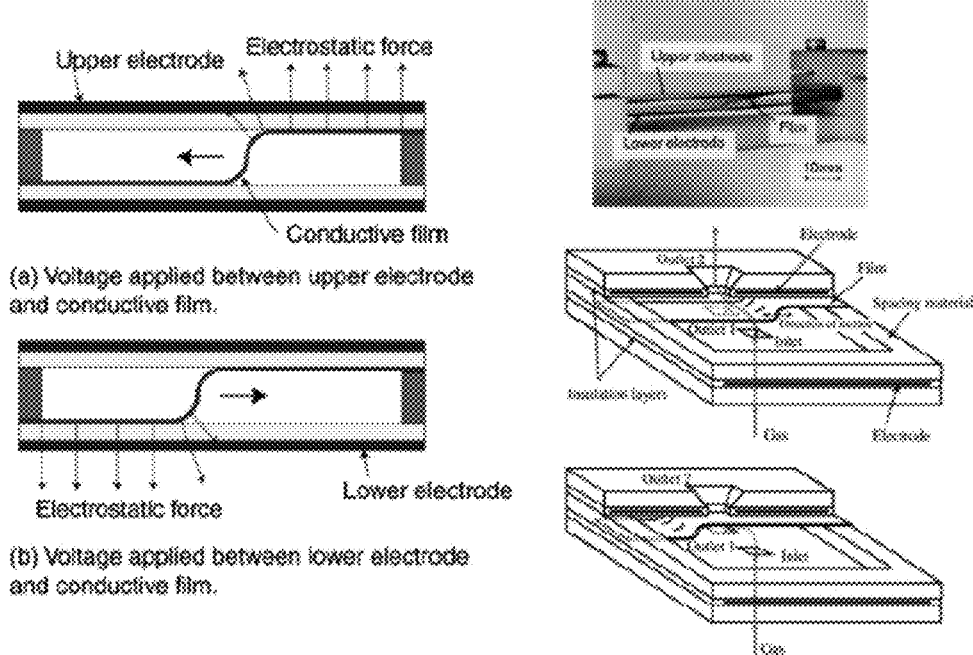
FIG. 4C depicts an illustrative S-shaped film microactuator according to an embodiment.

FIG. 4C depicts an S-shaped film microactuator. The S-shaped film microactuator may include an upper electrode, a lower electrode, and a conductive film in between the upper and lower electrodes. When a voltage is applied between the upper electrode and the conductive film, the film may move in a first direction, as illustrated in FIG. 4C(a). When a voltage is applied between the lower electrode and the film, the film may move in a second opposing direction, as illustrated in FIG. 4C(b).

Figure 4D:
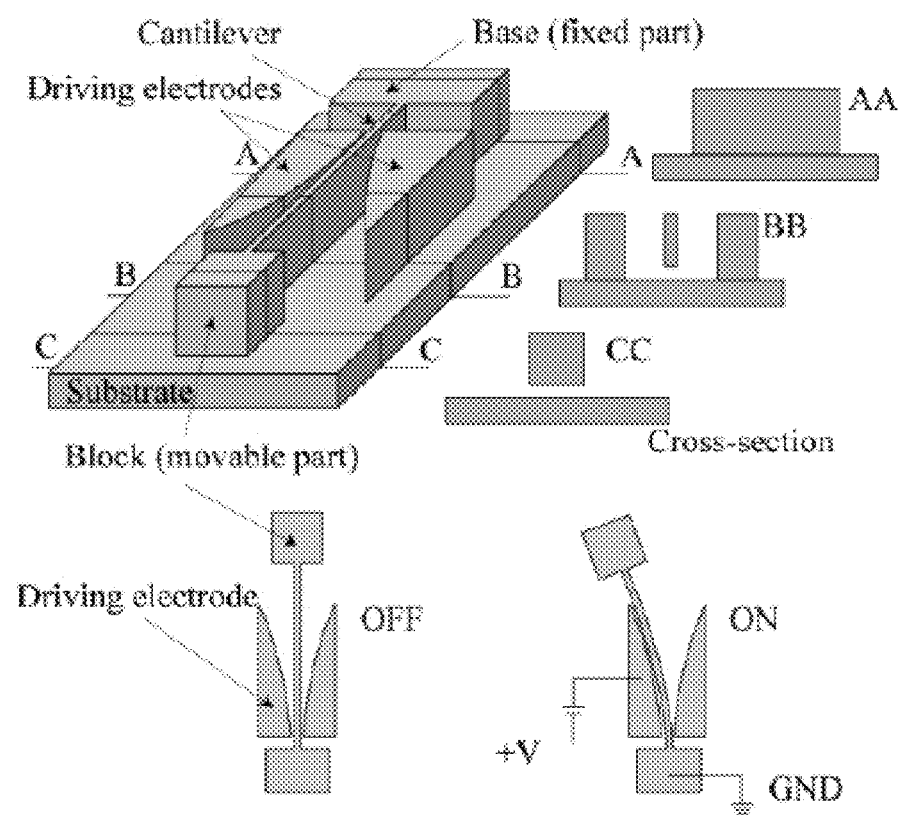
FIG. 4D depicts an illustrative tulip-shaped microactuator according to an embodiment.

FIG. 4D depicts a tulip-shaped microactuator. The tulip-shaped microactuator may include two driving electrodes and a movable block. When a voltage is applied between one of the driving electrodes and the movable block, the block may move toward the electrode. The block may be in a neutral position when no voltage is applied.

Figure 4E:
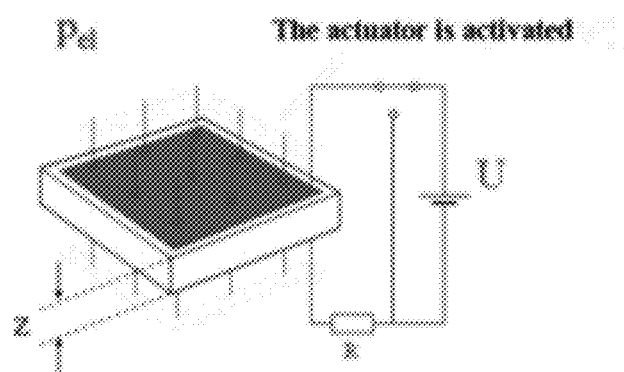
FIG. 4E depicts an illustrative electroactive polymer microactuator according to an embodiment.

FIG. 4E depicts an electroactive polymer microactuator. The electroactive polymer microactuator includes a plurality of surfaces having an elastomeric film deposited thereon. The plurality of surfaces also include one or more electrodes, which are connected together in a circuit. When a voltage is applied, an electrostatic pressure is generated. Mechanical compression resulting from the electrostatic pressure causes the elastomer film to contract in the thickness direction and expand in the film plane. The elastomer film may revert to its original position when the voltage is removed.

The solid material 140 may generally be any material that is now known or later developed for FDM or any other type of deposition forming. In some embodiments, the solid material 140 may be in filament form. In some embodiments, the solid material 140 may be a thermoplastic resin. An illustrative thermoplastic resin may include, but is not limited to, a thermoplastic homopolymer, copolymer, or mixture thereof having a Young's modulus of more than 500 MPa, an air permeation coefficient of less than $6 \times 10^{-11}$, and a melting point of about 100° C. to about 500° C., including, but not limited to, about 100° C., about 150° C., about 200° C., about 250° C., about 300° C., about 350° C., about 400° C., about 450° C., about 500° C., or any value or range between any two of these values (including endpoints). In an embodiment, the melting point may be in a range of about 200° C. to about 300° C. Particular thermoplastic resins may include a polyamide resin, a polyester resin, a polynitrile resin, a polymethacrylate resin, a polyvinyl resin, a cellulose resin, a fluorine resin, a polyimide resin, a polysulfone, a polyacetal, a polyacetone, polyphenylene oxide, polyphenylene sulfide, styrene-maleic anhydride, an aromatic polyketone, and/or any combination thereof. Illustrative polyamide resins may include, but are not limited to, nylon 6 (N6), nylon 66 (N66), nylon 46 (N46), nylon 1,1 (Ni 1), nylon 12 (N12), nylon 6,10 (N610), nylon 6,12 (N612), nylon 6/66 copolymer, (N6/66), nylon 6/66/610 (N6/66/610), nylon MXD6 (MXD6), nylon 6T (N6T), nylon 6/6T copolymer, nylon 66/PP copolymer, and nylon 66/PPS copolymer. Illustrative polyester resins may include, but are not limited to, polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxalkylene diimide diacid/polybutyrate terephthalate copolymer, and other aromatic polyesters. Illustrative polynitrile resins may include, but are not limited to, polyacrylonitrile (PAN), polymethacrylonitrile, acrylonitrile-styrene copolymers (AS), methacrylonitrile-styrene copolymers, and methacrylonitrile-styrene-butadiene copolymers. Illustrative polymethacrylate resins may include, but are not limited to, polymethyl methacrylate and polyethylacrylate. Illustrative polyvinyl resins may include, but are not limited to, ethylene-vinyl acetate (EVA), polyvinyl alcohol (PVA), ethylene vinyl alcohol (EVOH), vinyl alcohol/ethylene copolymer (EVOA), polyvinylidene chloride (PVDC), polyvinyl chloride (PVC), polyvinyl/polyvinylidene copolymer, and polyvinylidene chloride/methacrylate copolymer. Illustrative cellulose resin may include, but are not limited to, cellulose acetate and cellulose acetate butyrate. Illustrative fluorine resins may include, but are not limited to, polytetralluotoethylene (PTFE), polyvinylidene fluoride (PVDF) polyvinyl fluoride GYM, polychlorotrifluoroethylene (PCTFE), and tetrafluoroethylene/ethylene copolymer (ETFE). In particular embodiments, the solid material 140 may include at least one of acrylonitrile butadiene styrene, polylactic acid, polyphenylsulfone, polycarbonate, a polyamide, polystyrene, and lignin.

As previously described herein, the solid material 140 may be inserted into the first opening 110. In some embodiments, a drive mechanism may be used to drive the solid material 140 into the first opening 110 of the nozzle. The drive mechanism is not limited by this disclosure, and may generally be any drive mechanism now known or later developed. For example, as shown in FIG. 2E, the drive mechanism 150 may include a plurality of wheels 150a, 150b that counter rotate. The counter rotation of the wheels 150a, 150b may generally be toward each other such that a frictional movement is produced therebetween. For example, a first wheel 150a may rotate in a clockwise direction and a second wheel 150b may rotate in a counter-clockwise direction such that when a solid material 140 is inserted near an upper portion of the wheels 150a, 150b, a frictional movement of the wheels may push the solid material through space between the wheels towards the first opening, as indicated by the arrows. Accordingly, the solid material 140 may be driven into the nozzle 105. In some embodiments, the friction wheels 150a, 150b may be configured to press or otherwise shape the solid material 140 such that it fits within the first opening 110. In some embodiments, adjustment of the drive mechanism may be controlled via one or more signals received from a control device, as described in greater detail herein.

Figure 2D:
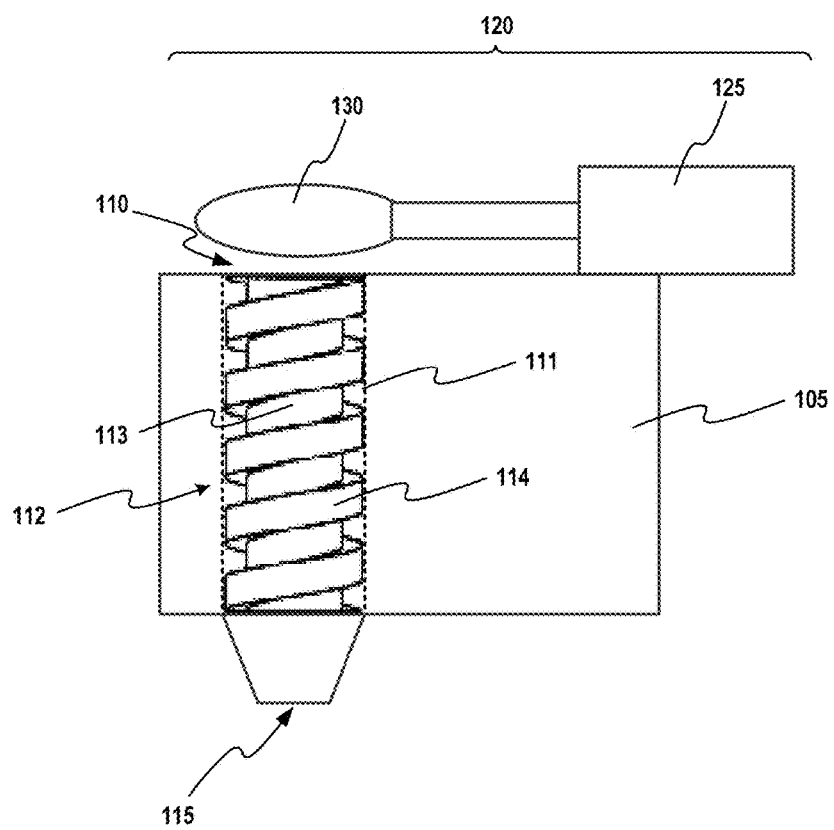
FIG. 2D depicts a cutaway side view of an illustrative nozzle according to a second embodiment.
Figure 2E:
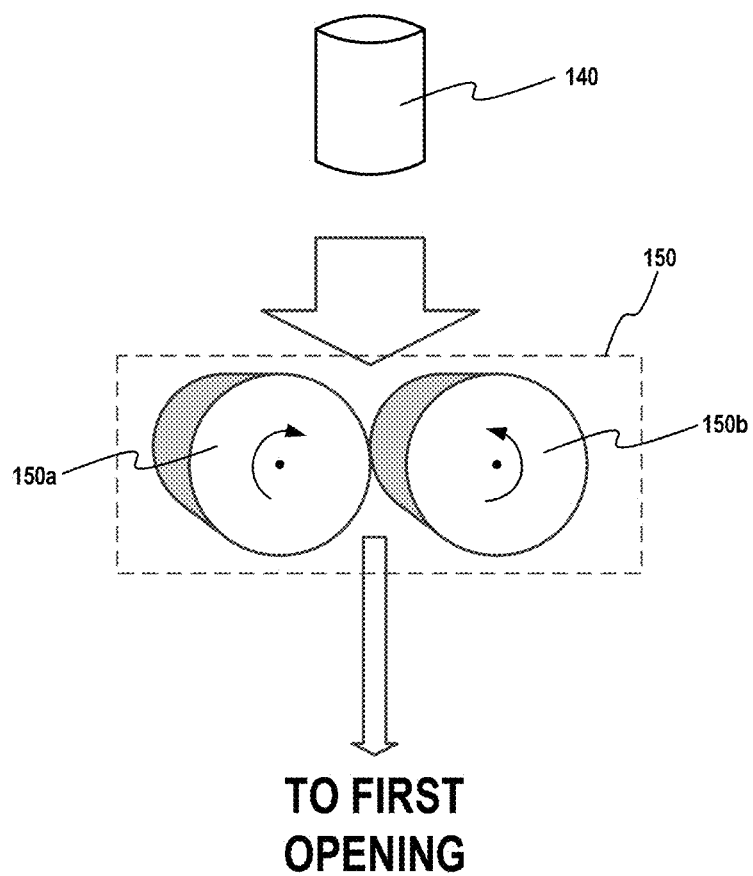
FIG. 2E depicts an illustrative drive mechanism according to an embodiment.

In various embodiments, such as is shown in FIG. 2D, the bore 111 between the first opening 110 and the second opening 115 may include an internal drive mechanism 112. The internal drive mechanism 112 may, for example, drive the solid material 140 through the bore such that it is ejected as molten material 145 from the second opening. The internal drive mechanism 112 is not limited by this disclosure, and may generally be any mechanism that can drive the solid material 140 through the bore 111. For example, the drive mechanism may include a rotatable shaft 113 having a threaded surface 114. The threaded surface 114 may be angled downward such that a rotation of the shaft 113 causes the threaded surface to direct the solid material 140 from the first opening 110 towards the second opening 115. Thus, the internal drive mechanism 112 may be configured to engage the solid material 140 received via the first opening 110 and direct it (as molten material 145) through the second opening 115. In some embodiments, the rotation of the shaft 113 may be adjustable such that a pressure and/or a flow rate of the molten material 145 can be controlled. For example, the shaft 113 may be rotated at a higher speed to increase the pressure and/or flow rate of the molten material 145. Similarly, the shaft 113 may be rotated at a lower speed to decrease the pressure and/or flow rate of the molten material 145. Such speeds for desired pressures and/or flow rates will be apparent to those having ordinary skill in the art. In some embodiments, adjustment of the shaft 113 may be completed via signals from a control device, as described in greater detail herein.

As previously described herein, the solid material 140 may be heated by the nozzle 105 such that it becomes molten material 145. Thus, the solid material 140 may be heated until it reaches its melting point. As previously described herein, the melting point is not limited by this disclosure and may vary based on the type of solid material used. Thus, the nozzle 105 may heat the solid material 140 to a temperature of about 100° C. to about 500° C. For example, the temperature may be about 100° C., about 150° C., about 200° C., about 250° C., about 300° C., about 350° C., about 400° C., about 450° C., about 500° C., or any value or range between any two of these values (including endpoints). In a particular embodiment, the temperature may be about 326° C. In some embodiments, the solid material 140 may be heated until it has a suitable melt flow rate. The melt flow rate may generally be an extrusion rate of a resin through an opening (such as the second opening 115) having defined dimensions at a specified temperature and load, which may be reported as temperature/load (for example, 190° C./2.16 kg). Melt flow rates may be used to differentiate grades or provide a measure of degradation of a material as a result of molding. The melt flow rate may be measured per ASTM D1238-04c Standard Test Method for Melt Flow Rates of Thermoplastics by Extrusion Plastometer, as will be recognized by those having ordinary skill in the art. If a melt flow rate of a particular polymer is specified, unless otherwise stated, it is the melt flow rate for that polymer alone, in the absence of any of the other components of the liquid toner composition. Melt flow may also be measured by a melt flow index (MFI), which is a measure of the rate of polymer melt flow through a capillary. The MFI is generally defined as the mass of polymer (in grams) flowing in ten minutes through the capillary having a particular diameter and length. Illustrative melt flow indices may include about 1 g/10 min to about 500 g/10 min. For example, the melt flow index of a polymer may be about 1 g/10 min, about 5 g/10 min, about 10 g/10 min, about 50 g/10 min, about 100 g/10 min, about 150 g/10 min, about 200 g/10 min, about 250 g/10 min, about 300 g/10 min, about 350 g/10 min, about 400 g/10 min, about 450 g/10 min, about 500 g/10 min, or any value or range between any two of these values (including endpoints).

Heating of the solid material 140 is not limited by this disclosure and may generally be completed by any method of heating. For example, various heating elements may be placed within the bore 111 to heat the solid material 140 until it becomes molten material 145. For example, the bore 111 may be lined with a heating coil. Heating may generally occur while the solid material 140 is in the bore 111. However, in some embodiments, the solid material 140 may be heated at or near the first opening 110 or prior to passing through the first opening.

To ensure that the molten material 145, when ejected from the second opening 115 is formed to a particular size and/or shape, it may be rapidly cooled after it is ejected from the second opening. Rapid cooling of the molten material 145 is not limited by this disclosure, and may include any methods or materials for rapid cooling. For example, in some embodiments, the molten material 145 may include various ingredients therein that cause it to rapidly cool automatically as soon as it is ejected from the second opening 115. In other embodiments, the second opening 115 may have a cooling device attached thereto that effects cooling of the molten material 145 substantially instantaneously after being ejected from the second opening. In other embodiments, a cooling device may be positioned near the second opening 115 such that it cools the molten material 145 shortly after being ejected from the second opening.

Figure 3:
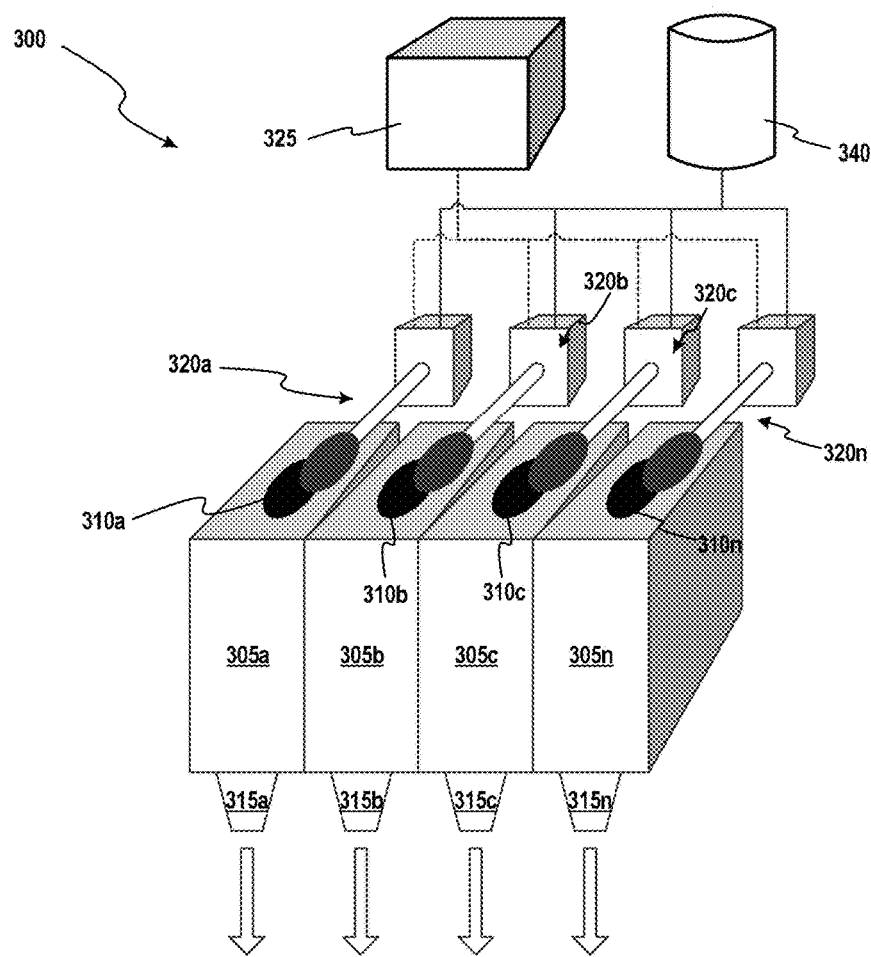
FIG. 3 depicts an illustrative nozzle array of an extrusion head according to an embodiment.

As shown in FIG. 3, an extrusion head in accordance with the present disclosure may include a plurality of nozzles 315a . . . n. The number of nozzles 315a . . . n is not limited by this disclosure. Accordingly, the number of nozzles 315a . . . n may be dependent upon a particular application, a desired speed of additive manufacturing, financial considerations, and/or the like. For purposes of simplicity, 4 nozzles 305a . . . n are depicted. The nozzles 305a . . . n may generally be arranged in any configuration. For example, certain nozzle 305a . . . n configurations may be necessary to obtain particular additive manufacturing results, to ensure proper movement of the extrusion head (as described in greater detail herein), and/or the like. Thus, in some embodiments, the nozzles 305a . . . n may be arranged in at least one row. In particular embodiments, the nozzles 305a . . . n may be arranged in a plurality of rows. In some embodiments, the nozzles 305a . . . n may be arranged in a grid-like array, such as a grid-like matrix or the like. In some embodiments, the nozzles 305a . . . n may be arranged in a staggered formation. Such a formation may allow for a portion of the nozzles 305a . . . n to deposit a first portion of molten material. While the first portion of molten material is cooled, a second portion of the nozzles 305a . . . n may deposit a second portion of the molten material.

As previously described herein, each nozzle 315a . . . n may include an actuator 320a . . . n configured to control an amount of solid material placed in the respective first opening 310a . . . n and/or an amount of molten material ejected from the respective second opening 315a . . . n. In some embodiments, a single actuator 320 may control the amount of solid material placed into each of a plurality of nozzles 305a . . . n. Thus, for example, a first actuator may be configured to control an amount of solid material for a first set of nozzles and a second actuator may be configured to control an amount of solid material for a second set of nozzles.

Each actuator 320a . . . n may be signaled by a control device 325. Thus, each actuator 320a . . . n may be connected to the control device by any means that allows for signaling. In some embodiments, the control device 325 may be wirelessly connected to each actuator 320a . . . n. In other embodiments, the control device 325 may be connected to each actuator 320a . . . n via a wired connection. The control device 325 may generally be configured to signal each actuator 320a . . . n to adjust an amount of the solid material received in the respective first opening 310a . . . n and/or the amount of molten material ejected from the respective second opening 315a . . . n, as described in greater detail herein. In some embodiments, the control device 325 may further be configured to signal each actuator 320a . . . n to adjust at least one of a pressure and a flow rate of the molten material ejected from the respective second opening 315a . . . n, as described in greater detail herein.

The control device 325 is generally not limited by this disclosure and may be any device configured to control the various elements described herein, including, but not limited to, the drive mechanism 150 (FIG. 2E), the internal drive mechanism 112 (FIG. 2D) each actuator 320a . . . n, and the like. In some embodiments, the control device 325 may be and/or incorporate a computing device, as described in greater detail herein.

In various embodiments, the control device 325 may be configured to signal each actuator 320a . . . n simultaneously. In other embodiments, the control device 325 may be configured to signal various actuators 320a . . . n at varying intervals. For example, the control device 325 may signal at least a first actuator and a second actuator for a substantially overlapping duration. In another example, the control device 325 may signal a first actuator and subsequently signal a second actuator without any overlap in signaling. Signal timing between the control device 325 and the various actuators 320a . . . n may generally be completed to ensure that an amount of molten material is deposited in a desired location with respect to other amounts of molten material to form an object, as described herein.

Figure 5:
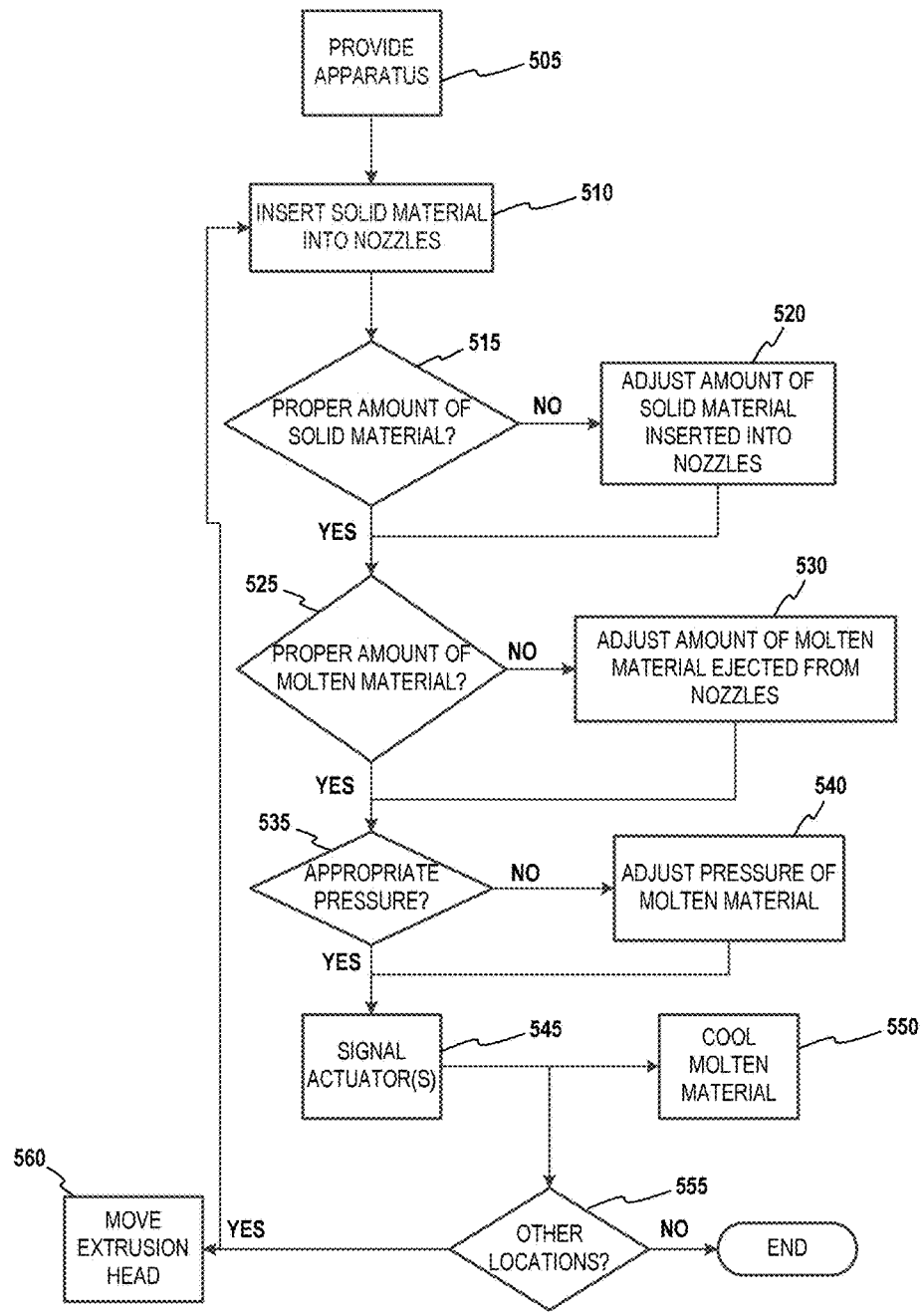
FIG. 5 depicts a flow diagram of an illustrative method of forming an object according to an embodiment.

FIG. 5 depicts a flow diagram of an illustrative method of forming an object according to an embodiment. The method may include providing 505 an apparatus, such as an apparatus described herein with respect to any of FIGS. 1-4. The method may further include inserting 510 solid material into the nozzles of the apparatus, such as, for example, via the first openings 310a . . . n (FIG. 3) of the nozzles.

In various embodiments, a determination 515 may be made as to whether a sufficient amount of solid material has been inserted 510. The determination 515 may generally be based upon a desired shape and size of the resultant extrudate, a flow rate and/or pressure of the molten material desired, a maximum amount of solid material that each nozzle is configured to receive, and/or the like. As previously described herein, the sufficiency of the amount may be determined 515 for each nozzle. Accordingly, the determination 515 may be different for at least a portion of the nozzles. If a sufficient amount of solid material has not been inserted into at least one nozzle, the amount may be adjusted 520. The amount may generally be adjusted 520 by adjusting a flow rate, adjusting a rate at which the drive apparatus drives the material into the first opening, and/or the like.

If a sufficient amount of solid material has been inserted and/or the amount has been appropriately adjusted 520, a determination 525 may be made as to whether a sufficient amount of molten material is or will be ejected from each nozzle. The determination 525 may generally be based upon a desired shape and size of the resultant extrudate, a flow rate and/or pressure of the molten material desired, a maximum amount of solid material that each nozzle is configured to receive, a maximum rate of molten material that each nozzle is configured to eject, and/or the like. As previously described herein, the sufficient amount may be determined 525 for each nozzle. Accordingly, the determination 525 may be different for at least a portion of the nozzles. If a sufficient amount of molten material has not been ejected, the amount may be adjusted 530. The amount may generally be adjusted 530 by adjusting a flow rate adjusting a rate at which the internal drive apparatus drives the material through the bore by rotating the shaft, and/or the like.

If a sufficient amount of molten material is or will be ejected and/or the amount has been appropriately adjusted 530, a determination 535 may be made as to whether the molten material is or will be ejected at a sufficient pressure. The determination 535 may generally be based upon a desired shape and size of the resultant extrudate, a flow rate and/or pressure of the molten material, a maximum amount of solid material that each nozzle is configured to receive, a maximum amount of molten material that each nozzle is configured to eject, and/or the like. As previously described herein, the pressure may be determined 535 for each nozzle. Accordingly, the determination 535 may be different for at least a portion of the nozzles. If the pressure of the molten material is not sufficient, the amount may be adjusted 540. The amount may generally be adjusted 530 by adjusting a flow rate, adjusting a rate at which the internal drive apparatus drives the material through the bore by rotating the shaft, and/or the like.

If the pressure is sufficient and/or the pressure has been appropriately adjusted 540, the actuators may be signaled 545. The actuators may generally be signaled 545 such that at least one nozzle deposits the molten material on a surface. As previously described herein, the actuators may be signaled 545 simultaneously, in an overlapping fashion, and/or at different intervals to effect deposition of the molten material in a desired shape, size, pattern, and/or the like.

Once the molten material has been deposited on the surface, the molten material may optionally be cooled 550 as described in greater detail herein and a determination 555 may be made as to whether the extrusion head should be moved to deposit additional molten material to form the object. In some embodiments, the determination 555 may be calculated by use of a computer program, such as a computer aided design (CAD) program, and/or the like. If the determination 555 is affirmative, the extrusion head may be moved 560, and the process may be repeated from step 510 to deposit additional molten material.

Figure 6:
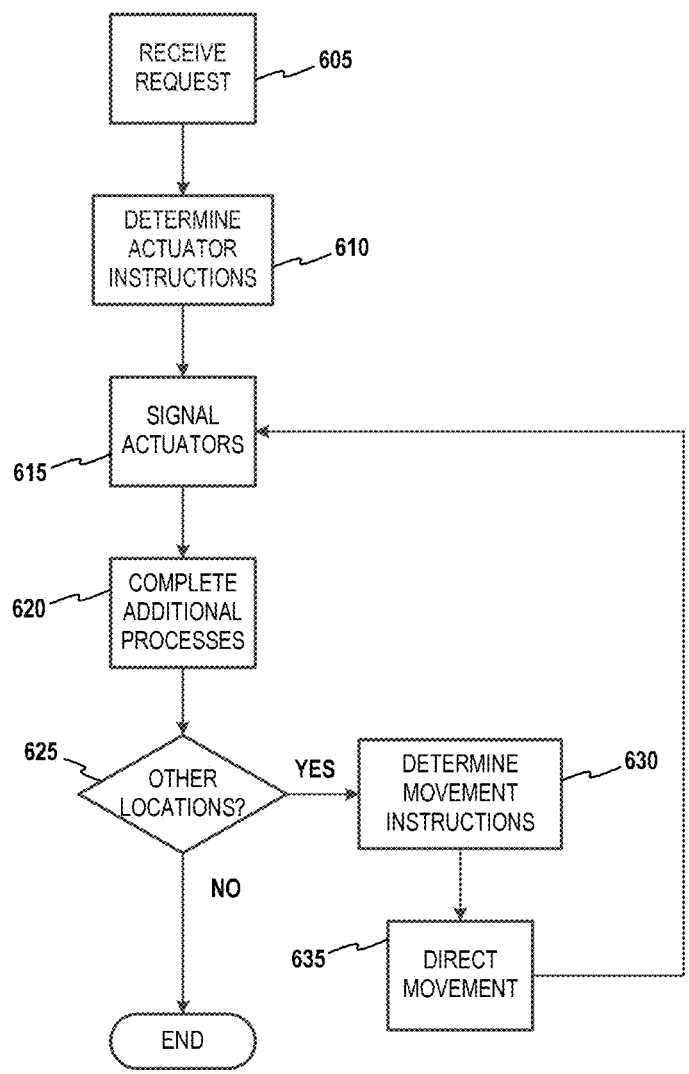
FIG. 6 depicts a flow diagram of an illustrative method of directing an extrusion head to form an object according to an embodiment.

FIG. 6 depicts a flow diagram of an illustrative method of directing an extrusion head to form an object according to an embodiment. In some embodiments, the method may be embodied as a plurality of programming instructions contained in a computer-readable storage medium, as described in greater detail herein. The method may include receiving 605 a request. The request may generally be a request to create the object. The request may include, for example, a plurality of CAD programming instructions that, when executed, cause the control device to signal at least one actuator, adjust pressures and/or flow rates, move the extrusion head, and/or the like, as described in greater detail herein. In some embodiments, the request may be inputted by a user and may not include programming instructions. In such embodiments, a determination 610 of actuator instructions may be necessary. The determination 610 may generally include determining actuator signaling, pressure and/or flow rate adjustments, extrusion head movements, and/or the like, as described herein.

The actuators may be signaled 615 such that the corresponding nozzles deposit molten material on a surface to form the object, as described in greater detail herein. The actuators may generally be signaled 615 such that the corresponding nozzles deposit the molten material in accordance with the at least one request that was received 605. As previously described herein, the actuators may be signaled 615 such that they deposit molten material simultaneously, in an overlapping fashion, and/or at different intervals. In some embodiments, signaling 615 may include directing the actuator to adjust a pressure and/or a flow rate of the molten material, as described in greater detail herein.

In various embodiments, additional processes may be completed 620. An illustrative additional process may include causing the rotatable shaft in the bore of each nozzle to rotate, thereby adjusting the pressure and/or the flow rate of the molten material deposited on the surface. Another illustrative additional process may include directing the drive mechanism to drive the solid material into each nozzle, as described in greater detail herein.

A determination 625 may be made as to whether the extrusion head should be moved to complete additional object formation processes. If the extrusion head has to be moved, movement instructions may be determined 630. In some embodiments, the CAD instructions may include extrusion head movement instructions, so a determination 630 may not be necessary. The extrusion head may be directed 635 to move with respect to the surface such that the nozzles are positioned to form the object. The process may repeat from step 615 as many times as necessary to effect creation of the object.

Figure 7:
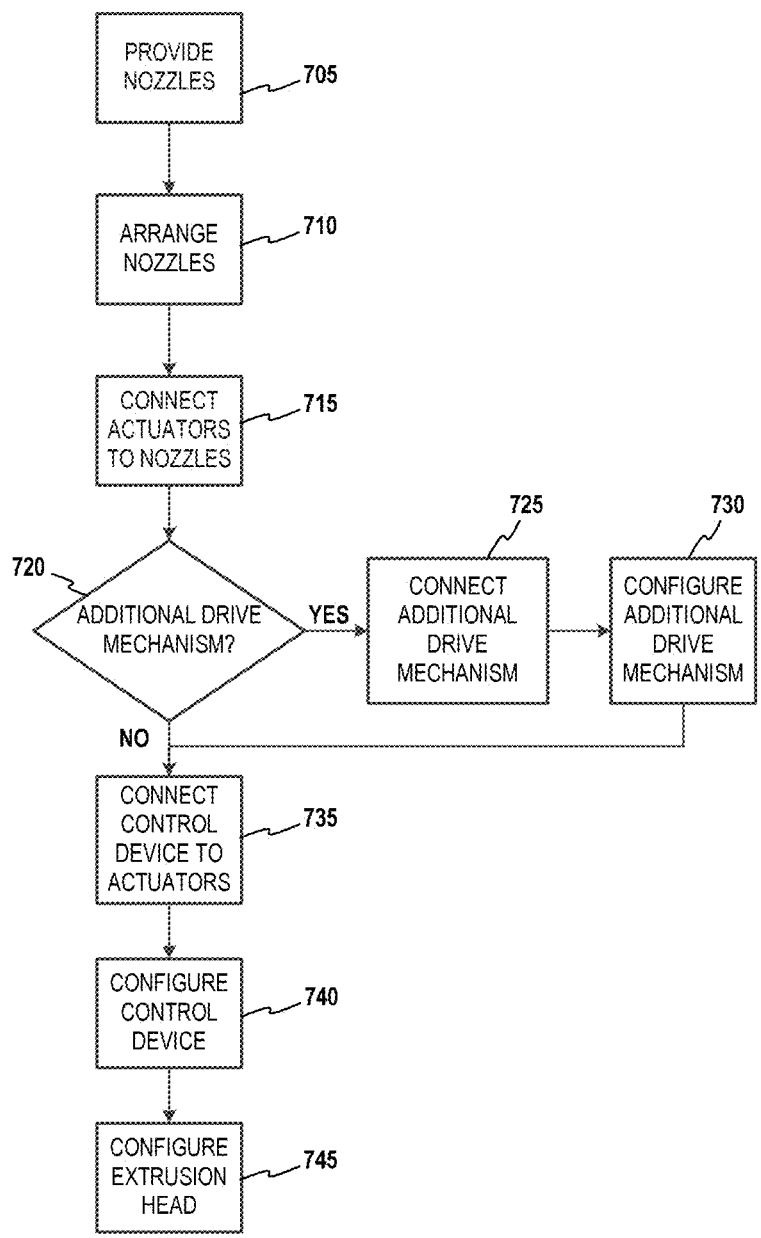
FIG. 7 depicts a flow diagram of an illustrative method of forming an extrusion head according to an embodiment.

FIG. 7 depicts a flow diagram of an illustrative method of forming the extrusion head described herein according to an embodiment. The method may include providing 705 the nozzles and arranging 710 the nozzles. The nozzles may generally be arranged 710 in any manner, particularly in formations suitable for additive manufacturing, as described herein. Thus, for example, the nozzles may be arranged in a grid-like matrix and/or in at least one row.

The actuators may be connected 715 to the nozzles such that each actuator is positioned adjacent to the first opening and/or the second opening of each respective nozzle. A determination 720 may be made as to whether additional drive mechanisms are necessary, such as the drive mechanisms described herein. If additional drive mechanisms are necessary, they may be connected 725 and configured 730 accordingly. Thus, a drive mechanism configured to drive the solid material may be placed adjacent to the first opening of each nozzle. Similarly, an internal drive mechanism, such as the rotatable shaft with a threaded surface may be placed within the bore of each nozzle and adjusted to control the pressure and/or flow of the molten material.

In various embodiments, the control device may be connected 735 to each actuator. The control device may generally be connected 735 such that it is in communication with each actuator and can signal each actuator, as described herein. The control device may additionally be configured 740 to signal the respective actuators to adjust an amount of solid material received in the first opening and an amount of molten material ejected from the second opening, as described in greater detail herein. As described herein, the control device may be configured 740 to signal each actuator simultaneously, in an overlapping manner, or at different intervals. As also described herein, the control device may be configured 740 to adjust pressure and/or flow rates of the molten material.

In various embodiments, the extrusion head may be configured 745 such that it is movable with respect to the surface upon which the molten material is ejected. As described herein, the extrusion head may be movable such that it forms a desired object.

Figure 8:
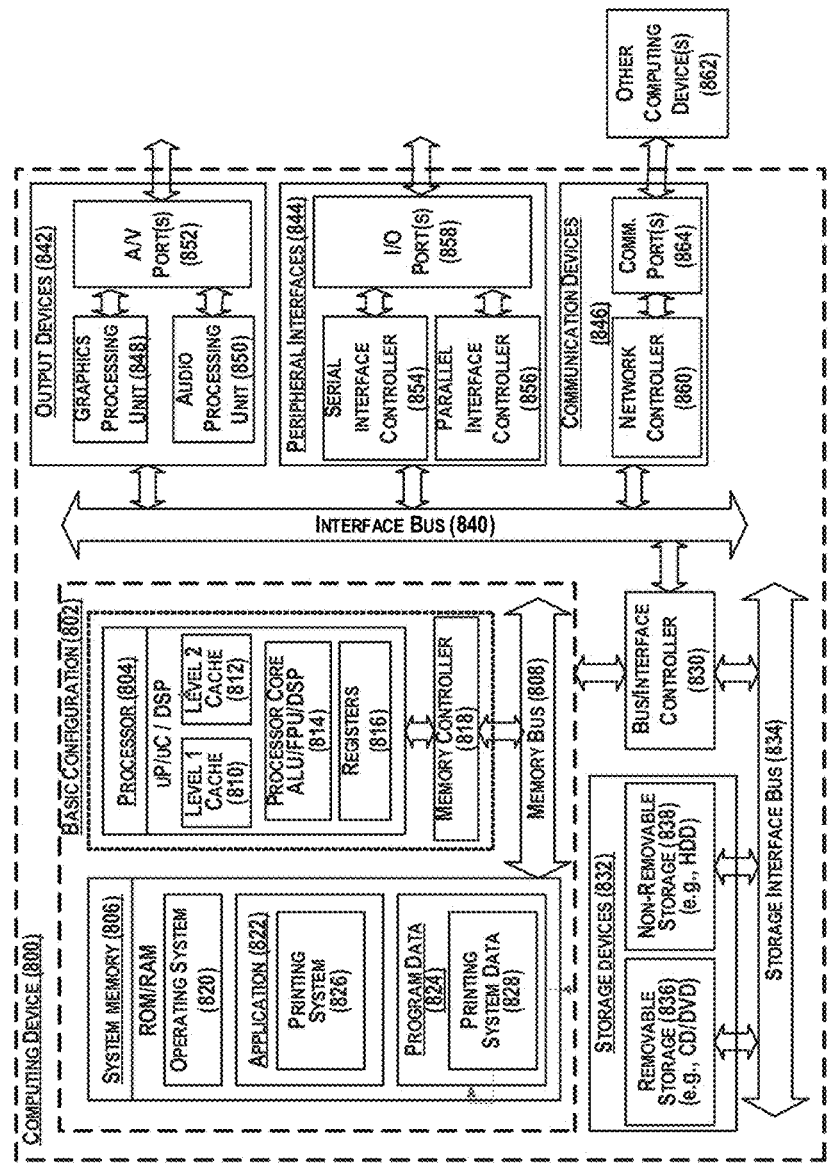
FIG. 8 depicts a block diagram of an illustrative computing device according to an embodiment.

FIG. 8 depicts an illustrative computing device 800 that may be used to contain or implement program instructions for controlling aspects of an additive manufacturing apparatus and/or components thereof according to some embodiments described herein. For example, the computing device 800 may be contained within the control device 325 (FIG. 3). In a very basic configuration 802, the computing device 800 typically includes one or more processors 804 and a system memory 806. A memory bus 808 may be used for communicating between processor 804 and system memory 806.

Depending on the desired configuration, the processor 804 may be of any type, including, but not limited to a microprocessor (µP), a microcontroller (µC), a digital signal processor (DSP), or any combination thereof. The processor 804 may include one or more levels of caching, such as a level one cache 810 and a level two cache 812, a processor core 814, and/or registers 816. The processor core 814 may include an arithmetic logic unit (ALU), a floating point unit (FPU), a digital signal processing core (DSP Core), or any combination thereof. A memory controller 818 may also be used with the processor 804. In some implementations, the memory controller 818 may be an internal part of the processor 804.

Depending on the desired configuration, the system memory 806 may be of any type, including, but not limited to, volatile memory (such as RAM), non-volatile memory (such as ROM, flash memory, etc.) or any combination thereof. The system memory 806 may include an operating system 820, one or more applications 822, and program data 824. An application 822 may include a printing system manager 826 that is arranged to manage aspects of an additive manufacturing apparatus as described herein. Program data 824 may include data obtained from operation of the additive printing apparatus and/or various components thereof. In some embodiments, the application 822 may be arranged to operate with program data 824 on the operating system 820 such that certain components of the additive printing apparatus may operate according to some embodiments described herein. This described basic configuration 802 is illustrated in FIG. 8 by those components within the inner dashed line.

The computing device 800 may have additional features or functionality, and additional interfaces to facilitate communications between the basic configuration 802 and any required devices and interfaces. For example, a bus/interface controller 830 may be used to facilitate communications between the basic configuration 802 and one or more data storage devices 832 via a storage interface bus 834. The data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 806, the removable storage devices 836, and the non-removable storage devices 838 are examples of computer storage media. Computer storage media includes, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (for example, output devices 842, peripheral interfaces 844, and communication devices 846) to the basic configuration 802 via the bus/interface controller 830. Illustrative output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (for example, keyboard, mouse, pen, voice input device, touch input device, etc.) or other peripheral devices (for example, printer, scanner, etc.) via one or more I/O ports 858. An illustrative communication device 846 includes a network controller 860, which may be arranged to facilitate communications with one or more other computing devices 862 over a network communication link via one or more communication ports 864.

The network communication link may be one example of a communication medium. Communication media may typically be embodied by computer readable instructions, data structures, or program modules, and may include any information delivery medium. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media.

The computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 800 may also be implemented as a personal computer including both laptop computer and non-laptop computer configurations.

EXAMPLES

Example 1: Extrusion Head

An extrusion head used in an extrusion-based layered deposition apparatus for creating polymer electronic device cases will include 25 nozzles. The nozzles will be arranged in a 5×5 grid. The number of nozzles in the extrusion head will allow for the extrusion head to create an electronic device case in a fraction of the time necessary for conventional fused deposition modeling extrusion heads because more polymer material can be placed and formed at the same time with greater accuracy because the extrusion head does not have to move as frequently.

Each nozzle in the extrusion head will have a first opening at the top of the nozzle for receiving solid polytetrafluoroethylene (PTFE) therein. A friction wheel will be used to drive the PTFE into the first opening. A bore connecting the first opening to a second opening in the bottom of the nozzle will be lined with heating coils and contain a threaded shaft therein. The heating coils will melt the PTFE to its melting point of about 326° C., and the threaded shaft will be rotatable to engage the molten PTFE material and push it through the second opening. The molten PTFE will be regulated at the second opening such that it is deposited at a desired interval, pressure, and flow rate. Regulation of the PTFE at the second openina will be completed by a piezoelectric microactuator.

A single PTFE source will be used to provide the PTFE to each of the 25 nozzles in the extrusion head. In addition, a single control device will be configured to provide control signals to each of the 25 piezoelectric microactuators. The control signals will direct each piezoelectric microactuator to deposit the molten PTFE at the desired interval, pressure, and flow rate. The signals will be sent to each piezoelectric microactuator simultaneously and in overlapping durations. Calculation of signals provided by the control device to each of the piezoelectric microactuators will be completed by a processing device located in the control device. The processing device may receive programming instructions from a CAD file that corresponds to a desired electronic device case to be manufactured.

Example 2: Forming an Object

The processing device described above with respect to Example 1 will receive programming instructions in the form of a CAD file that is loaded into memory connected to the processing device. The CAD file will contain specific dimensions of the desired electronics device case to be manufactured. The processing device will receive the programming instructions and will determine the necessary signals to be sent to each of the piezoelectric microactuators, various movements of the extrusion head, and an amount of solid PTFE to be delivered to each nozzle to create the electronic device case.

Once all of the signals have been determined, the control device will signal each of the nozzles according to the determination. The nozzles will receive, heat, and eject the PTFE onto a manufacturing surface when signaled. The control device will also signal the extrusion head to move as necessary so that the nozzles are all appropriately positioned when ejecting the PTFE.

The electronic device case will be formed with a higher accuracy and at a quicker and more efficient pace than what is typically achieved with conventional FDM devices. As a result, the electronic device case manufacturer is able to create electronic device cases at a more rapid pace to keep up with increasing consumer demand.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, k and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative icons, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An extrusion head for an additive manufacturing apparatus, the extrusion head comprising:
   a plurality of nozzles, each nozzle comprising:
      a first opening configured to receive a solid material therein;
      a second opening configured to eject a molten material therefrom, wherein the solid material is heated to form the molten material; and
      a bore extending through the nozzle and connecting the first opening and the second opening;
   a plurality of microactuators, wherein the plurality of microactuators and the plurality of nozzles are arranged such that each microactuator is coupled to a corresponding one of the plurality of nozzles, wherein each of the plurality of microactuators is configured to control a first amount of the solid material received in the first opening of the corresponding one of the plurality of nozzles and a second amount of the molten material ejected from the second opening of the corresponding one of the plurality of nozzles, and wherein the first amount is different from the second amount; and a control device configured to signal each of the plurality of microactuators to adjust the first amount and the second amount to ensure that the second amount is deposited at a desired interval, pressure, and flow rate to form an object.

2. The extrusion head of claim 1, wherein each nozzle further comprises a rotatable shaft retained within the bore, the rotatable shaft having a threaded surface and configured to engage the received solid material and push the molten material through the second opening, wherein a rotational movement of the rotatable shaft is adjustable to control at least one of a pressure and a flow rate of the molten material through the second opening.

3. The extrusion head of claim 1, wherein each nozzle further comprises a friction drive apparatus comprising a plurality of counter-rotating wheels that produce a frictional movement therebetween, and wherein the solid material is driven into the nozzle when it is passed between the counter-rotating wheels.

4. The extrusion head of claim 1, wherein each of the plurality of microactuators is selected from the group consisting of a piezoelectric microactuator, a comb-drive microactuator, an S-shaped film microactuator, a tulip-shaped microactuator and an electroactive polymer microactuator.

5. The extrusion head of claim 1, wherein the plurality of nozzles are arranged in a grid-like matrix or in at least one row.

6. The extrusion head of claim 1, wherein the solid material is a thermoplastic resin.

7. The extrusion head of claim 1, wherein the solid material comprises at least one of acrylonitrile butadiene styrene, polylactic acid, polyphenylsulfone, polycarbonate, a polyamide, polystyrene, and lignin.

8. The extrusion head of claim 1, wherein the extrusion head is movable with respect to a surface upon which the molten material is ejected.

9. A method of forming an object, the method comprising:
providing an additive manufacturing apparatus comprising an extrusion head, the extrusion head comprising:
a plurality of nozzles, each nozzle comprising:
a first opening configured to receive a solid material therein;
a second opening configured to eject a molten material therefrom, wherein the solid material is heated to form the molten material; and
a bore extending through the nozzle and connecting the first opening and the second opening;
a plurality of microactuators, wherein the plurality of microactuators and the plurality of nozzles are arranged such that each microactuator is coupled to a corresponding one of the plurality of nozzles, wherein each of the plurality of microactuators is configured to control a first amount of the solid material received in the first opening of the corresponding one of the plurality of nozzles and a second amount of the molten material ejected from the second opening of the corresponding one of the plurality of nozzles, and wherein the first amount is different from the second amount; and
a control device configured to signal each of the plurality of microactuators to adjust the first amount and the second amount to ensure that the second amount is deposited at a desired interval, pressure, and flow rate to form an object;
providing the solid material to the plurality of nozzles of the extrusion head;
adjusting the first amount and the second amount via the plurality of microactuators; and
signaling each of the plurality of microactuators such that at least one nozzle deposits the second amount on a surface in a specified location to form the object.

10. The method of claim 9, further comprising rotating a shaft disposed within a bore of each nozzle, wherein rotating causes a change in at least one of a pressure and a flow rate of the molten material deposited on the surface.

11. The method of claim 9, further comprising directing a friction drive apparatus to drive the solid material into each nozzle.

12. The method of claim 9, further comprising moving the extrusion head in one or more directions with respect to the surface such that the nozzles deposit the molten material in a desired manner.

13. A system for directing an extrusion head to form an object, the system comprising:
a plurality of nozzles in the extrusion head, a plurality of microactuators, wherein the plurality of microactuators and the plurality of nozzles are arranged such that each microactuator is coupled to a corresponding one of the plurality of nozzles, wherein each of the plurality of nozzles comprises a first opening, and a second opening, wherein each of the plurality of microactuators is configured to control a first amount of a solid material received in the first opening of the corresponding one of the plurality of nozzles and a second amount of a molten material ejected from the second opening of the corresponding one of the plurality of nozzles, and wherein the first amount is different from the second amount;
a processor; and
a non-transitory, computer-readable storage medium in communication with the processor, the non-transitory, computer-readable storage medium comprising one or more programming instructions that, when executed, cause the processor to:
receive at least one request to create the object, and
signal each of the plurality of microactuators to adjust an amount of the molten material deposited by each of the corresponding one of the plurality of nozzles in accordance with the at least one request such that the deposited molten material forms the object in a specified location on a surface.

14. The system of claim 13, wherein the non-transitory, computer-readable storage medium further comprises one or more programming instructions that, when executed, cause the processor to cause a rotatable shaft disposed within each nozzle to rotate, wherein rotating the shaft causes a change in at least one of a pressure and a flow rate of the molten material deposited on the surface.

15. The system of claim 13, wherein the non-transitory, computer-readable storage medium further comprises one or more programming instructions that, when executed, cause the processor to direct a friction drive apparatus to drive a solid material into each nozzle.

16. The system of claim 13, wherein the one or more programming instructions that, when executed, cause the processor to signal each of the plurality of microactuators further comprise one or more programming instructions that, when executed, cause the processor to signal each of the plurality of microactuators simultaneously.

17. The system of claim 13, wherein the non-transitory, computer-readable storage medium further comprises one or more programming instructions that, when executed, cause the processor to:

determine at least one instruction for the extrusion head to move in one or more directions with respect to the surface; and direct the extrusion head to move with respect to the surface such that the nozzles are positioned to form the object.

18. The extrusion head of claim 1, wherein the control device is configured to signal each of the plurality of microactuators to adjust the first amount based on a determination of whether an amount of the solid material inserted into a corresponding nozzle is sufficient to form a specific shape and size of the object.

19. The extrusion head of claim 1, wherein the control device is configured to signal each of the plurality of microactuators to adjust the second amount based on a determination of whether an amount of the molten material deposited from a corresponding nozzle is sufficient to form a specific shape and size of the object.

20. The extrusion head of claim 1, wherein the plurality of nozzles are arranged in a staggered formation.

* * * * *